(12) United States Patent
Asaumi et al.

(10) Patent No.: US 10,270,303 B2
(45) Date of Patent: Apr. 23, 2019

(54) PERMANENT MAGNET ELECTRIC MOTOR HAVING SLITS AND PROJECTIONS TO MINIMIZE IRREVERSIBLE DEMAGNETIZATION

(71) Applicant: Hitachi-Johnson Controls Air Conditioning, Inc., Minato-ku, Tokyo (JP)

(72) Inventors: Yusuke Asaumi, Tokyo (JP); Akihiro Ishikawa, Tokyo (JP); Akeshi Takahashi, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 254 days.

(21) Appl. No.: 14/786,186

(22) PCT Filed: Mar. 31, 2014

(86) PCT No.: PCT/JP2014/059482
§ 371 (c)(1),
(2) Date: Oct. 22, 2015

(87) PCT Pub. No.: WO2014/175009
PCT Pub. Date: Oct. 30, 2014

(65) Prior Publication Data
US 2016/0072347 A1    Mar. 10, 2016

(30) Foreign Application Priority Data
Apr. 23, 2013  (JP) ................. 2013-090101

(51) Int. Cl.
*H02K 1/27*  (2006.01)
*H02K 1/16*  (2006.01)

(52) U.S. Cl.
CPC ............ *H02K 1/276* (2013.01); *H02K 1/16* (2013.01); *H02K 1/2753* (2013.01)

(58) Field of Classification Search
CPC ......... H02K 1/16; H02K 1/276; H02K 1/2753
(Continued)

(56) References Cited

U.S. PATENT DOCUMENTS

| 9,214,838 B2 * | 12/2015 | Li ........................ H02K 1/276 |
| 2006/0273678 A1 * | 12/2006 | Futami ................. H02K 1/276 |
| | | 310/156.53 |

(Continued)

FOREIGN PATENT DOCUMENTS

| CN | 101060261 A | 10/2007 |
| CN | 102754308 A | 10/2012 |

(Continued)

OTHER PUBLICATIONS

Chinese-language Office Action issued in counterpart Chinese Application No. 201480023099.5 dated Feb. 22, 2017 with English translation (Eleven (11) pages).

(Continued)

*Primary Examiner* — Bernard Rojas
*Assistant Examiner* — Rashad H Johnson
(74) *Attorney, Agent, or Firm* — Crowell & Moring LLP

(57) ABSTRACT

In a permanent magnet electric motor, a plurality of projections are formed at least partially along an axial direction in the magnet insertion openings, the projection positioning both edges of the permanent magnet in the circumferential direction so that vacant spaces are defined at each sides of the permanent magnet in the circumferential direction; a plurality of slits arranged along the circumferential direction are provided in regions, the region being positioned radially outward from the permanent magnet and being sandwiched at the edges of the permanent magnet in the circumferential direction by the projections; and the shortest distance between the slit and the magnet insertion opening is set to be (Continued)

greater than the shortest distance between the slit and an outer circumferential surface of the rotor core.

3 Claims, 11 Drawing Sheets

(58) Field of Classification Search
USPC .................................. 310/156.08, 156.53
See application file for complete search history.

(56) References Cited

U.S. PATENT DOCUMENTS

| | | | |
|---|---|---|---|
| 2007/0257576 A1 | 11/2007 | Adaniya et al. | |
| 2008/0018190 A1* | 1/2008 | Takahata | H02K 1/276 310/156.56 |
| 2008/0224558 A1* | 9/2008 | Ionel | H02K 1/2766 310/156.57 |
| 2008/0272667 A1 | 11/2008 | Ionel et al. | |
| 2009/0230803 A1* | 9/2009 | Nakayama | H02K 1/2766 310/156.56 |
| 2010/0117477 A1* | 5/2010 | Yoshino | H02K 1/276 310/156.53 |
| 2012/0242182 A1 | 9/2012 | Yabe et al. | |
| 2013/0113328 A1* | 5/2013 | Kogure | H02K 1/2766 310/156.53 |
| 2015/0084468 A1* | 3/2015 | Nigo | H02K 1/276 310/156.53 |

FOREIGN PATENT DOCUMENTS

| | | |
|---|---|---|
| CN | 103026585 A | 4/2013 |
| JP | 2004-320952 A | 11/2004 |
| JP | 2007-312591 A | 11/2007 |
| JP | 4666500 B2 | 4/2011 |
| JP | 2011-101595 A | 5/2011 |
| JP | 2012-95474 A | 5/2012 |
| JP | 2012-217249 A | 11/2012 |
| WO | WO 2008/137709 A2 | 11/2008 |
| WO | WO 2011/096094 A1 | 8/2011 |
| WO | WO 2013/114542 A1 | 8/2013 |
| WO | WO 2014/068655 A1 | 5/2014 |

OTHER PUBLICATIONS

International Search Report (PCT/ISA/210) issued in PCT Application No. PCT/JP2014/059482 dated Jun. 10, 2014, with English translation (four (4) pages).

Chinese-language Office Action issued in counterpart Chinese Application No. 201480023099.5 dated Aug. 25, 2017 with English translation (Twelve (12) pages).

* cited by examiner

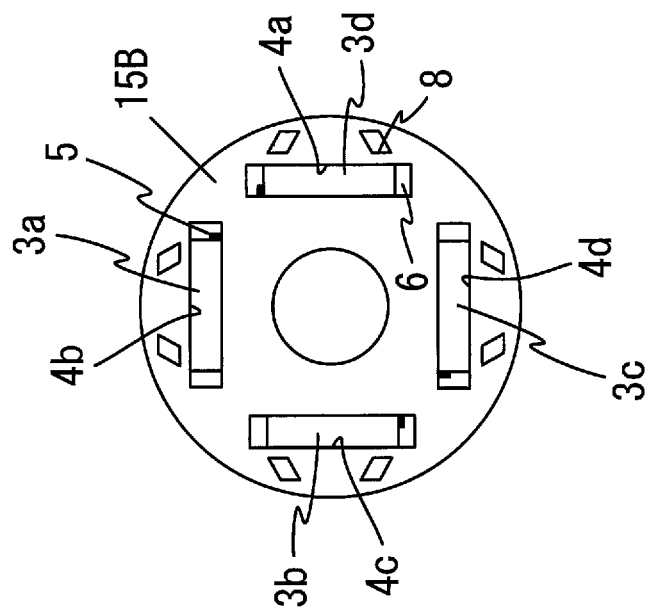
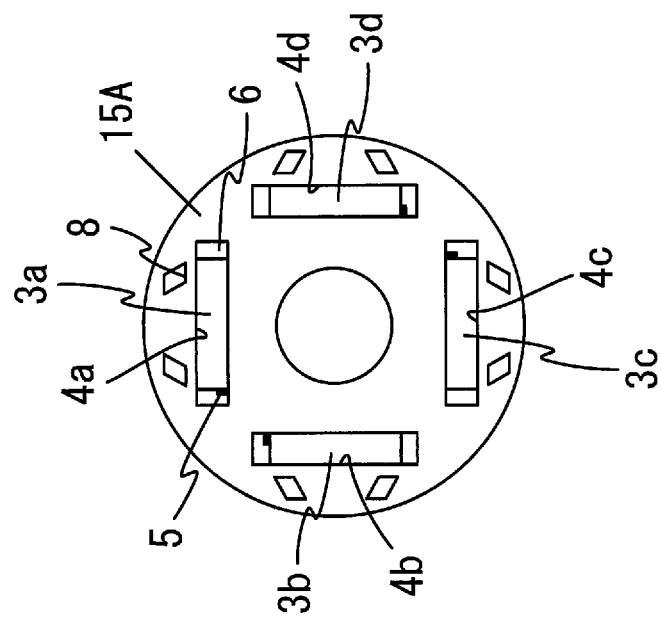

PERMANENT MAGNET ELECTRIC MOTOR HAVING SLITS AND PROJECTIONS TO MINIMIZE IRREVERSIBLE DEMAGNETIZATION

TECHNICAL FIELD

The present invention relates to a permanent magnet electric motor.

BACKGROUND ART

In the prior art, a construction for the rotor of a permanent magnet electric motor is per se known in which, in order to enhance the efficiency, vacant spaces for preventing leakage of magnetic flux and projections for performing positional determination and fixing of the permanent magnets are provided at the edge portions of permanent magnet insertion openings in the circumferential direction. (For example, refer to Patent Document #1).

CITATION LIST

Patent Literature

Patent Document #1: Japanese Patent 4,666,500.
Patent Document #2: Japanese Laid-Open Patent Publication 2012-95474.

SUMMARY OF INVENTION

Technical Problem

During starting, loss of synchronism, an error by the control software or the like of a permanent magnet electric motor it sometimes happens that the rotating magnetic field becomes a demagnetizing field. In a permanent magnet electric motor, if a demagnetizing magnetic field having the opposite orientation to the direction of magnetization of one or more of the permanent magnets is applied, the magnetism of the permanent magnet or magnets is reduced. However, even if a demagnetizing magnetic field is applied within the range in which the B-H curve is represented in linear on the B-H curve for the permanent magnet, the magnetism of the permanent magnet returns to its original level upon the demagnetizing magnetic field being removed; but, if a demagnetizing magnetic field is applied in a range exceeding the knick point of the B-H curve, in which the behavior becomes non-linear, then, even when the demagnetizing magnetic field is removed, the magnetism does not recover and the system degenerates into the so-called state of "irreversible demagnetization". If this type of irreversible demagnetization (hereinafter also sometimes simply termed "demagnetization") happens to a permanent magnet that is being used in a permanent magnet motor, there is a possibility that it may become impossible for the permanent magnet motor to provide its proper performance, for example to provide high torque or high efficiency or the like. With a construction such as that described in Patent Document #1, when a demagnetizing magnetic field is applied, the demagnetizing magnetic field is concentrated and is applied at the projections, so that irreversible demagnetization may occur at the edge portions of the permanent magnets. Moreover, with a construction such as that described in Patent Document #2 in which slits are formed in the projecting portions, and in which the width of the locations between the slits and the outer circumferential surface of the rotor core is large, the strength of the demagnetizing magnetic field that is applied at those locations between the slits and the outer circumferential surface of the rotor core is great, so that the demagnetizing magnetic field that is applied to the projections is increased, and irreversible demagnetization may occur at the permanent magnet edge portions.

Solution to Technical Problem

According to the 1st aspect of the present invention, a permanent magnet electric motor comprises: a rotor that comprises a rotor core around a circumferential direction of which a plurality of magnet insertion openings are formed, and a plurality of permanent magnets that are inserted in the plurality of magnet insertion openings; and a stator that comprises a stator core around a circumferential direction of which a plurality of slots are formed, and windings that are inserted into the plurality of slots; wherein: a plurality of projections are formed at least partially along an axial direction in the magnet insertion openings, the projection positioning both edges of the permanent magnet in the circumferential direction so that vacant spaces are defined at each sides of the permanent magnet in the circumferential direction; a plurality of slits arranged along the circumferential direction are provided in regions, the region being positioned radially outward from the permanent magnet and being sandwiched at the edges of the permanent magnet in the circumferential direction by the projections; and the shortest distance between the slit and the magnet insertion opening is set to be greater than the shortest distance between the slit and an outer circumferential surface of the rotor core.

Advantageous Effects of Invention

According to the present invention, it is possible to enhance the resistance of the permanent magnets to demagnetization.

BRIEF DESCRIPTION OF DRAWINGS

FIGS. 11A and 11B are sectional views of a rotor of a permanent magnet electric motor according to a fourth embodiment of the present invention, taken in the radial direction.

DESCRIPTION OF EMBODIMENTS

In the following, in order to explain the present invention, by way of example, the permanent magnet electric motor of the present invention will be supposed to be a four-pole six-slot concentrated winding motor.

Embodiment #1

Figure 1:
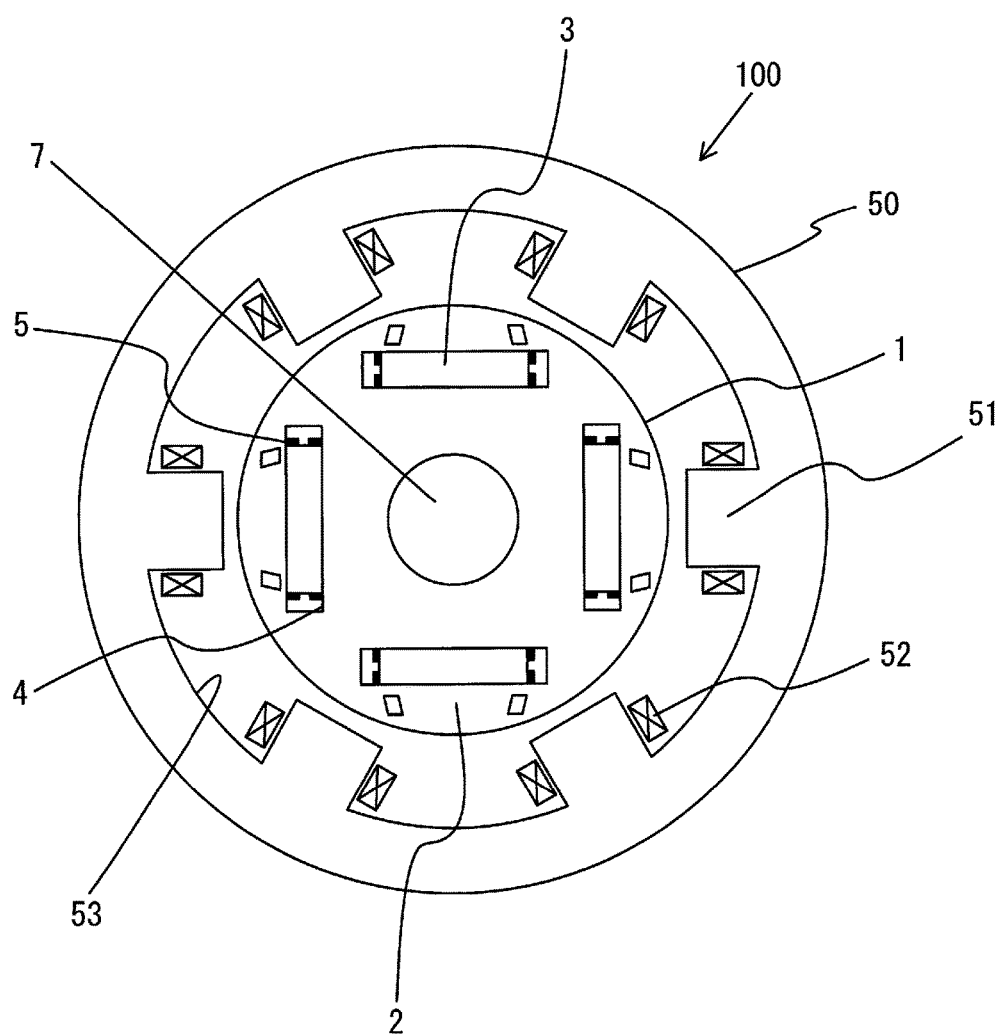
FIG. 1 is a sectional view of a permanent magnet electric motor according to a first embodiment of the present invention, taken in the radial direction.
Figure 2:
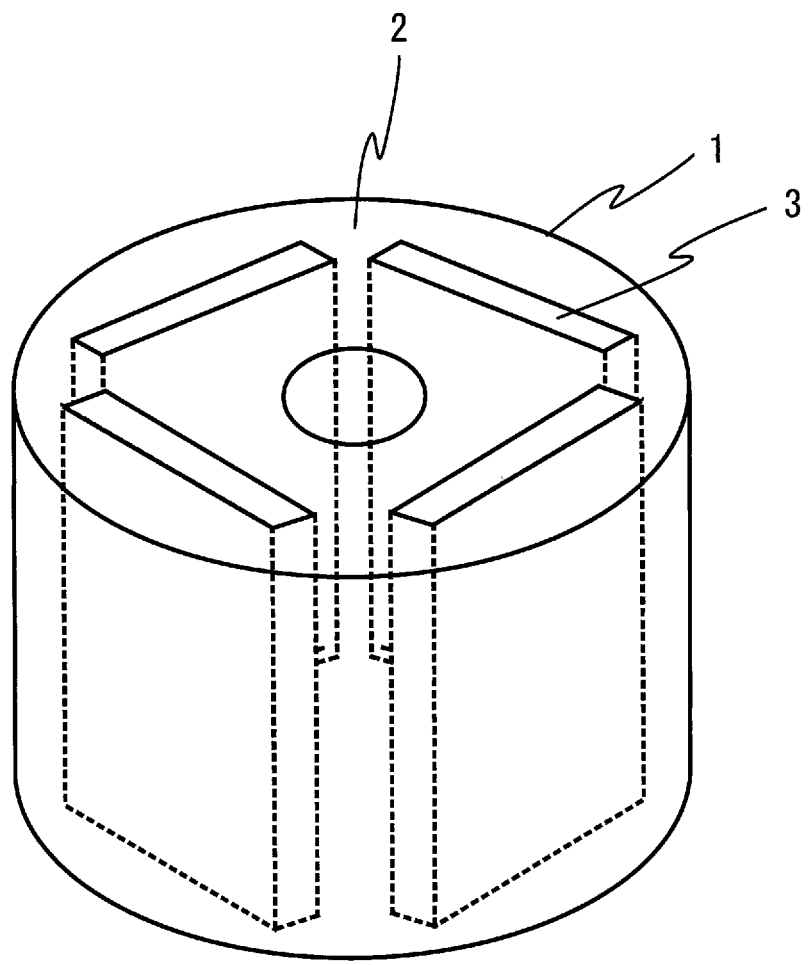
FIG. 2 is a perspective view of a rotor of this permanent magnet electric motor according to the first embodiment of the present invention.

FIG. 1 is a sectional view of a permanent magnet electric motor 100 according to a first embodiment of the present invention, taken in the radial direction. Moreover, FIG. 2 is a perspective view of the rotor 1. The rotor 1 comprises a rotor core 2 and permanent magnets 3, and transmits power to the exterior via an output shaft that is inserted into a shaft aperture 7. Magnet insertion openings 4 are formed in the rotor core 2 at four locations around its circumferential direction, and one of the permanent magnets 3 is inserted in each of these. Projections 5 for positioning the permanent magnets 3 are formed in the magnet insertion openings 4. The rotor core 2 may be made from laminated steel plates layered and overlapped in the axial direction, or may be made as a powder core or the like, or may be made from amorphous metal or the like. The magnet insertion openings 4 (not shown in the figures) are provided at four locations in the rotor core 2 of the rotor 1, and one of the permanent magnets 3 is inserted into each of these. A stator 50 is disposed around the circumferential direction of the rotor 1, with a vacant space being left between them. Teeth 51 and stator slots 53 are formed in the stator 50, and windings 52 are fitted in the stator slots 53. A power conversion device (not shown in the figures) is connected to the windings 52, and the rotor 1 is rotationally driven by three phase AC power being flowed to the windings 52.

Figure 3:
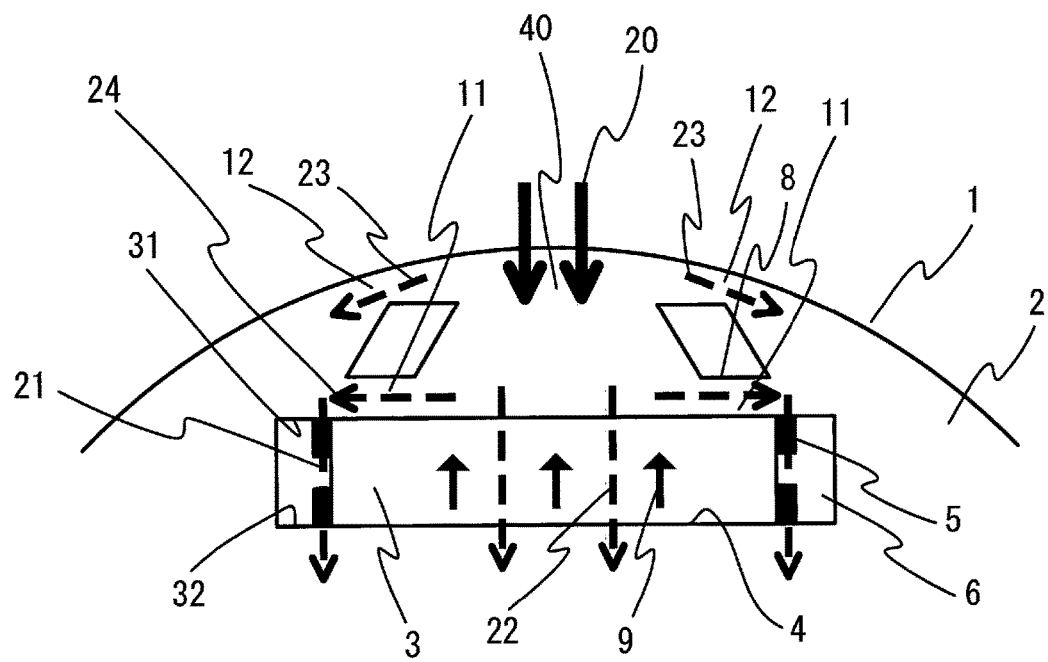
FIG. 3 is a sectional view of one pole in this rotor of the permanent magnet electric motor according to the first embodiment of the present invention, taken in the radial direction.

FIG. 3 is a sectional view taken in the radial direction through one of the poles of this rotor 1 of the permanent magnet electric motor 100 according to the first embodiment of the present invention. Vacant spaces 6 are provided in the magnet insertion opening 4 in order to prevent leakage of magnetic flux. Since the vacant spaces 6 are present, there is a fear that the magnet 3 will not remain in its set position within the magnet insertion opening 4 when the rotor 1 rotates. Due to this, projections 5 are formed in the magnet insertion opening 4, and these projections 5 position the permanent magnet 3. It should be understood that the projections 5 are integral with the rotor core 2, although the projections 5 are shown in black ink in the figure for the purposes of emphasis. The same holds for all of the projections 5 described below.

Now, the theory of enhancement of the resistance to demagnetization provided by slits 8 will be explained with reference to FIG. 3. When, due to a cause such as loss of synchronism or the like, a demagnetizing magnetic field 20 is applied from the teeth 51 of the stator 50 (not shown in this figure) so as to oppose the direction of magnetization 9 of the permanent magnet 3, if there were no such slits 8, this demagnetizing magnetic field would be concentrated at the projections 5. As a result, the demagnetizing magnetic field 21 would be increased, and a situation would be established in which the edge portions in the circumferential direction of the permanent magnet 3 could easily become demagnetized. Accordingly two slits 8 are arranged along the circumferential direction at the region that is positioned outward in the radial direction of permanent magnet 3 and that is sandwiched between the projections 5 at both edges of the permanent magnet 3 in the circumferential direction, which separates the magnetic paths from the portion 40 of the rotor 1 where the demagnetizing magnetic field is applied to the projections 5 into magnetic paths 11 and magnetic paths 12, and constricts the magnetic paths. Due to this, the magnetic reluctances of the magnetic paths 11 and 12 become great and the demagnetizing magnetic fields 23 and 24 along these paths become weak, and as a result the demagnetizing magnetic fields 21 applied to the projections 5 are reduced, so that demagnetization of the edge portions of the permanent magnet 3 in the circumferential direction is suppressed, and thereby the resistance of the permanent magnet 3 to demagnetization is enhanced.

Figure 4:
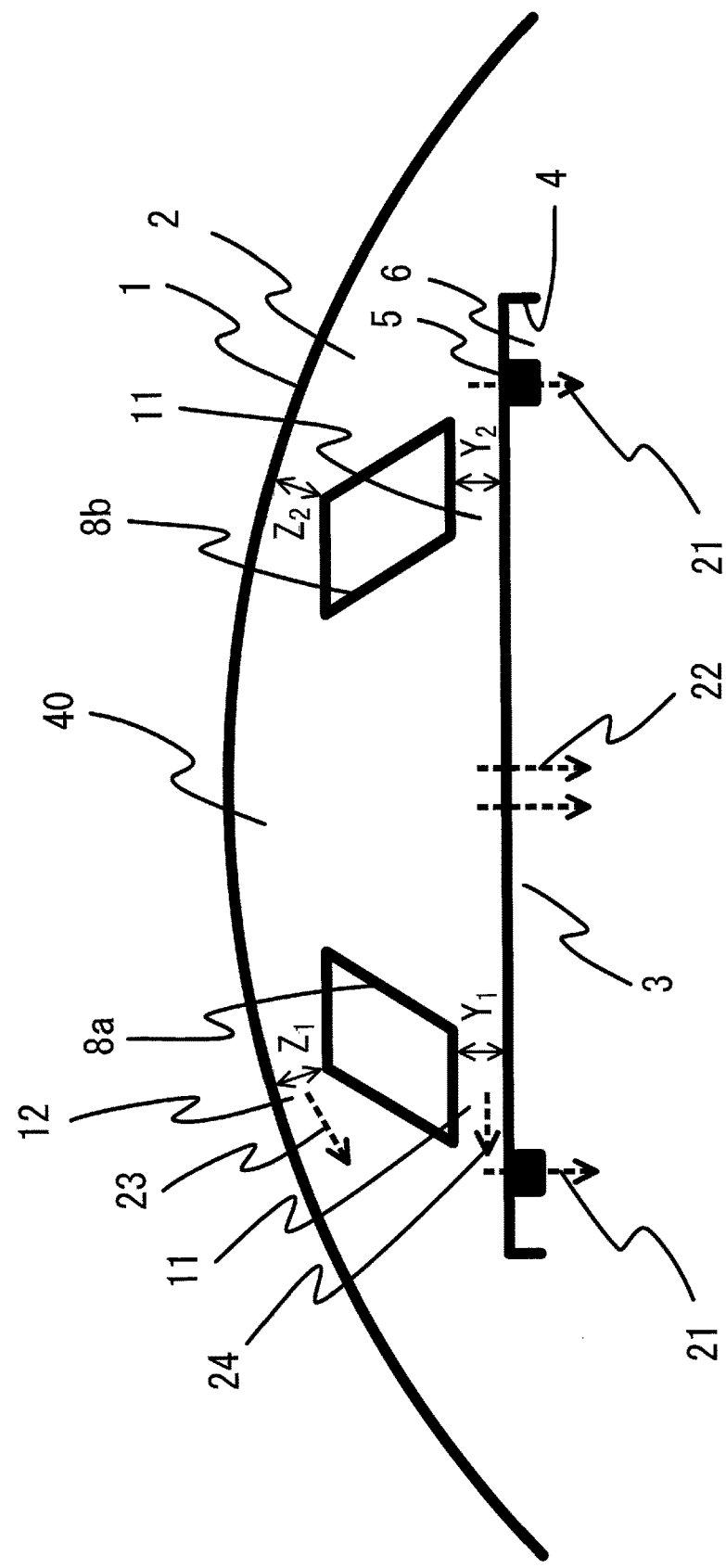
FIG. 4 is an enlarged sectional view of one pole in this rotor of the permanent magnet electric motor according to the first embodiment of the present invention, taken in the radial direction.

FIG. 4 is an enlarged sectional view taken in the radial direction through one pole in the rotor 1 of the permanent magnet electric motor 100 according to the first embodiment of the present invention. For the convenience of explanation, the left side slit 8 in the figure of the slits 8 formed at two locations is designated by the reference symbol 8a, while the right side slit 8 in the figure of them is designated by the reference symbol 8b. When the demagnetizing magnetic fields 23 applied in the rotor magnetic paths 12 sandwiched between the slits 8a and 8b and the outer circumferential surface of the rotor core 12 are large, then the demagnetizing magnetic fields 21 applied at the neighborhoods of the edge portions of the permanent magnet 3 in the circumferential direction increase, and the edge portions of the permanent magnet 3 in the circumferential direction become demagnetized. However, a limitation condition is imposed by providing appropriate settings in relation to the slits 8a and 8b. First, let the least width of the magnetic path 11 defined between the slit 8a and the magnet insertion opening 4 be termed Y1, and let the least width of the magnetic path 11 defined between the slit 8b and the magnet insertion opening 4 be termed Y2. And let the minimum one of Y1 and Y2 be termed Y. In the following, this will be termed "the shortest distance Y between the slits 8 and the magnet insertion opening 4". Next, let the least width of the rotor magnetic path 12 defined between the slit 8a and the outer circumferential surface of the rotor core 2 be termed Z1. In a similar manner, let the least width of the rotor magnetic path 12 defined between the slit 8b and the outer circumferential surface of the rotor core 2 be termed Z2. Moreover, let the minimum one of Z1 and Z2 be termed Z. In the following, this will be termed "the shortest distance Z between the slit 8 and the outer circumferential surface of the rotor core 2". And the limitation condition is taken as being that the shortest distance Y between the slits 8 and the magnet insertion opening 4 is greater than the shortest distance Z between the slit 8 and the outer circumferential surface of the rotor core 2 (i.e., that Y>Z). Since, due to this, the magnetic reluctance of the rotor magnetic path 12 becomes greater as compared to the magnetic reluctance of the rotor magnetic path 11, accordingly the demagnetizing magnetic fields 23 are limited and increase of the demagnetizing magnetic fields 21 is prevented, so that it is possible to prevent demagnetization of the edge portions of the permanent magnet 3 and it is possible to enhance the resistance of the permanent magnet 3 to demagnetization.

According to the first embodiment described above, the following beneficial operational effects are obtained.

(1) It is arranged for the slits 8 to be arranged in a range that is positioned on the external circumferential sides of the permanent magnets 3 of the rotor core 2 in the radial direction and that is sandwiched by the projections 5 on both sides the permanent magnet 3 disposed at the same pole. Due to this, it is possible to weaken the demagnetizing magnetic fields 23 and 24 along these paths, so that it is possible to reduce the demagnetizing magnetic fields 21 that are applied to the projections 5, and it is thereby possible to enhance the resistance of the permanent magnet 3 to demagnetization.

(2) It is arranged for the shortest distance Y between the slit 8 and the magnet insertion opening 4 to be set to be less than the shortest distance Z between the slit 8 and the outer circumferential surface of the rotor core 2. Due to this, when the demagnetizing magnetic field 23 applied to the rotor magnetic paths 12 sandwiched between the slit 8 and the outer circumferential surface of the rotor core 2 is large, the demagnetizing magnetic fields 21 applied at the neighborhoods of the edge portions of the permanent magnet 3 in the circumferential direction is reduced, and accordingly it is possible to prevent demagnetization of these edge portions of the permanent magnet 3 in the circumferential direction.

—Variants of Embodiment #1—

Figure 5:
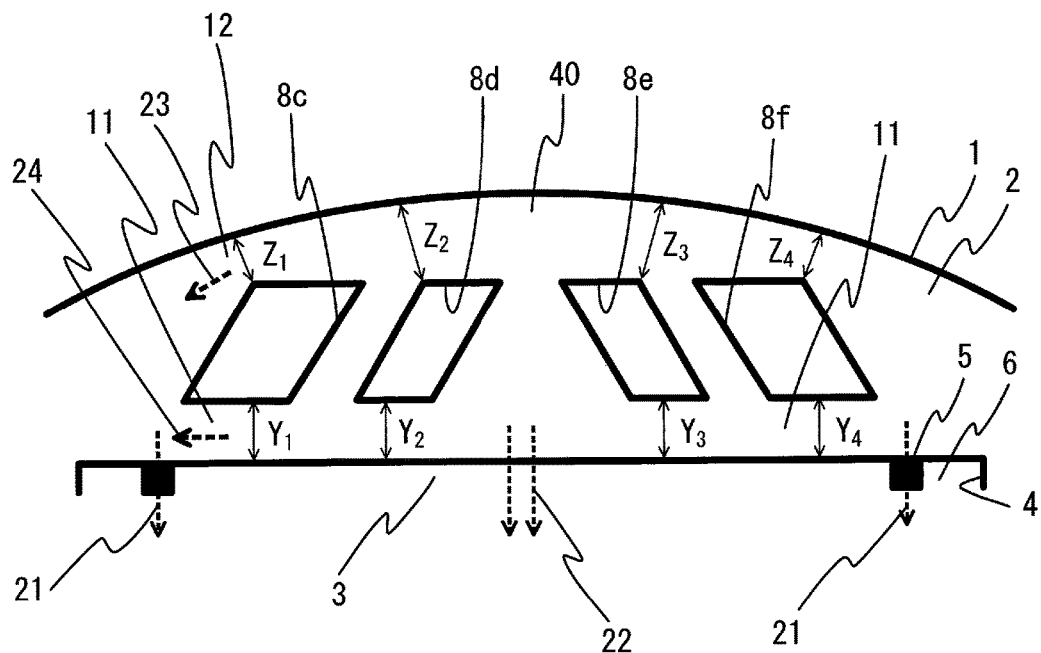
FIG. 5 is an enlarged sectional view of one pole in a rotor of a permanent magnet electric motor according to a variant of the first embodiment of the present invention, taken in the radial direction.

While in the first embodiment a case was described in which slits 8 were provided at two locations around the circumferential direction for one pole in the rotor 1, it would also be possible to arrange to provide slits 8 at three or more locations around the circumferential direction. FIG. 5 is a figure showing a variant of the first embodiment, in which, as an example, slits 8 are provided at four locations around the circumferential direction. For the convenience of explanation, the reference symbols 8c, 8d, 8e, and 8f from the left in the figure are appended to the slits 8. In this case, Y and Z are defined in the same manner as in the above case in which two slits 8 were provided. In concrete terms, Y is defined as being the minimum value among the shortest distances Y1, Y2, Y3, and Y4 between the magnet insertion opening 4 and the slits 8c through 8f respectively, while Z is defined as being the minimum value among the shortest distances Z1, Z2, Z3, and Z4 between the outer circumferential surface of the rotor core 2 and the slits 8c through 8f respectively. In a similar manner to the case when slits 8 were formed at two locations, by satisfying the limitation condition that Y>Z, increase of the demagnetizing magnetic fields 21 is prevented, so that it is possible to prevent demagnetization of the edge portions of the permanent magnets 3 and it is possible to enhance the resistance to demagnetization of the permanent magnets 3.

Moreover while, in the explanation of this embodiment, an example of a four-pole six-slot concentrated winding permanent magnet motor 100 was described, it would also be possible to obtain similar beneficial effects if the number of poles, or the number of slots, or the type of winding, or the like is different.

Embodiment #2

In the first embodiment and the variant embodiment thereof, it was described to enhance the resistance to demagnetization of the permanent magnets 3 by reducing the demagnetizing magnetic fields 21 that originate in the projections 5 with the slits 8. Now, since the cause of the irreversible demagnetization of the edge portions of the permanent magnet 3 is the projections 5, it is possible further to enhance the resistance to demagnetization of the permanent magnet 3 by removing some of the projections 5. However, if the projections 5 are not removed in an appropriate manner, then the beneficial effect of performing positioning of the permanent magnet 3, which is the main advantage of the projections 5, will be lost. In this embodiment, a method is described of reducing the number of the projections 5 without losing the beneficial effect of performing positioning of the permanent magnet 3. It should be understood that the structure of the stator 50 and the windings 52 and so on in this embodiment is the same as in the case of the first embodiment, and accordingly explanation thereof will be omitted.

Figure 6:
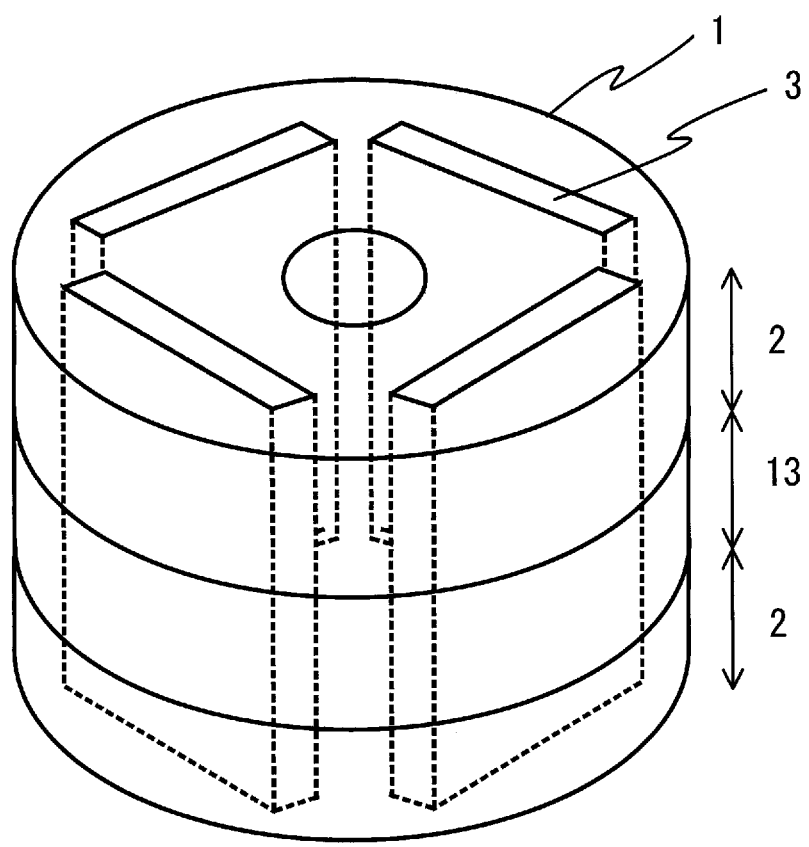
FIG. 6 is a perspective view of a rotor of a permanent magnet electric motor according to a second embodiment of the present invention.

FIG. 6 is a perspective view of a four pole rotor 1 of a permanent magnet electric motor 100 according to this second embodiment of the present invention. The aspect by which the structure of the rotor 1 shown in FIG. 6 differs from that of the rotor 1 shown in FIG. 2 is that the rotor 1 is constructed by layering together two rotor cores 2 and a rotor core 13 in the axial direction. The structure of the rotor core 13 will be described hereinafter.

Figure 7:
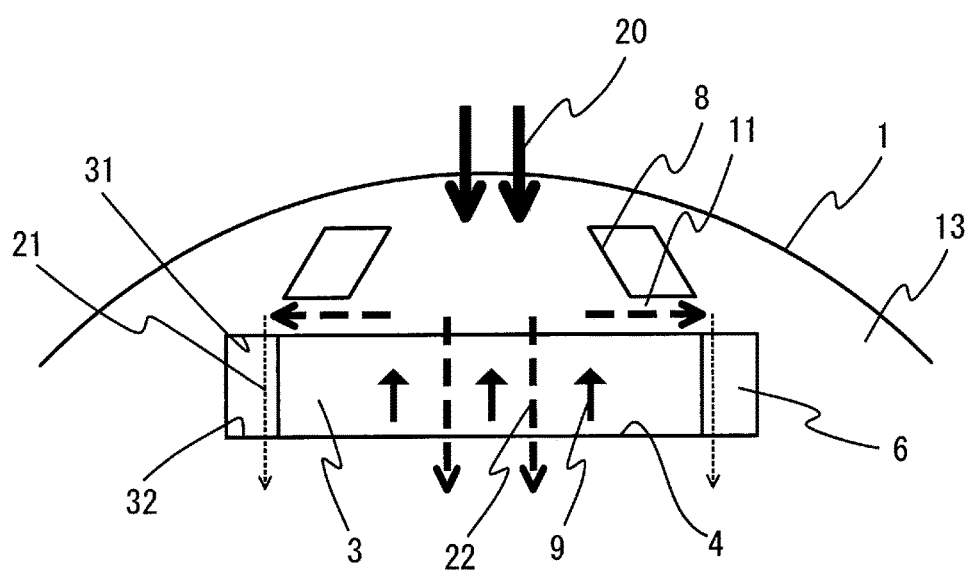
FIG. 7 is a sectional view of one pole in this rotor of the permanent magnet electric motor according to the second embodiment of the present invention, taken in the radial direction.

FIG. 7 is a sectional view of one pole in this rotor 1 of the permanent magnet electric motor 100 according to the second embodiment of the present invention, taken in the radial direction, and is a sectional view taken in the radial direction that includes the rotor core 13. The aspect by which the structure of the rotor core 13 differs from that of the rotor cores 2 is that no projections 5 are provided thereto. With a structure like that of the rotor core 13, even if a demagnetizing magnetic field 20 opposite to the direction of magnetization 9 of the permanent magnet 3 is applied from the teeth 51 of the stator 50 (not shown in this figure), since the projections 5 that were the cause of concentration of the demagnetizing magnetic field are not present, accordingly the demagnetizing magnetic field 21 that is applied in the neighborhoods of the edge portions in the circumferential direction of the permanent magnet 3 is reduced. And, as a result, the resistance of the permanent magnet 3 to demagnetization is enhanced.

Since, as described above, the rotor core 13 does not have any projections 5, accordingly no positioning of the permanent magnets 3 is performed by the rotor core 13. However, since the rotor 1 of this embodiment also incorporates the rotor cores 2, accordingly the permanent magnets 3 are adequately positioned by the projections 5 of the rotor cores 2.

As described above, according to this second embodiment, it is possible to reduce the extent of the projections 5 which constitute the cause of increase of the demagnetizing magnetic field 21, without losing the beneficial effects of positioning of the permanent magnet 3. As a result, it is possible to reduce the demagnetizing magnetic field 21, so that it is possible to enhance the resistance of the permanent magnet 3 to demagnetization.

While, in this embodiment, the rotor core 13 was built by being sandwiched between the two rotor cores 2, it would also be acceptable for the rotor core 2 to be sandwiched between two of the rotor cores 13, or to provide a two layered structure in which each layer consists of one rotor core 13 and one rotor core 2, or to provide a structure in which rotor cores 13 and rotor cores 2 are arranged alternately in multiple layers.

While, in this embodiment, it is arranged to construct the rotor core of the rotor 1 by laminating together in the axial direction the rotor core 13 that has no projections 5 and the rotor cores 2 that have projections 5, it would also be possible to build the rotor core of the rotor 1 with a single rotor core, and to reduce the regions along which the projections 5 are formed. As an example, the rotor core of the rotor 1 described in connection with the first embodiment may be altered. While the rotor core of the rotor 1 described in connection with the first embodiment consisted only of the rotor core 2, all of its projections 5 were formed all the way along the axial direction. By removing a portion of regions where the projection 5 is formed along the axial direction, it is possible to reduce the demagnetizing magnetic fields 21 originating in the projection 5 in a similar manner to the case of the rotor 1 shown in this embodiment, so that it is possible to enhance the resistance of the permanent magnet 3 to demagnetization. However since, as shown in connection with this embodiment, with the method of manufacturing the rotor core 13 that has no projections 5 and the rotor cores 2 that have projections 5 individually and then layering them together, it is not necessary to form each of the projections 5 upon only a portion of the rotor core along its axial direction, accordingly there is the advantageous aspect that it becomes simple and easy to manufacture a rotor core for the rotor 1 with the reduced regions where the projections 5 are formed.

In this embodiment, it would also be possible to obtain similar beneficial effects if the number of poles, or the number of slots, or the type of winding, or the like is different.

Embodiment #3

In the second embodiment, if for example the rotor cores 2 and the rotor core 13 are made from laminated steel plates overlapped upon one another and layered in the axial direction, then it becomes necessary to provide two different types of molds for manufacturing these laminated steel plates in a press machine, so that the suitability for mass production is not excellent. A strategy for solving this problem will now be described in the following as a third embodiment. In this case, the projections 5 that are provided in the magnet insertion opening 4 of the rotor core 2 are formed at each of the four corner edges of the permanent magnet 3 that is to be inserted. It is possible to position the permanent magnet 3 if there is a single projection 5 at each of the edges of the permanent magnet 3, but, by forming the projections 5 at each of the four corner edges in this manner, the beneficial effects of positioning the permanent magnet 3 become greater. This embodiment also tackles the problem of arranging the projections 5 at each of the four corner edges of the permanent magnet 3. It should be understood that, in this embodiment, the structure of the stator 50 and the windings 52 and so on in this embodiment is the same as in the case of the first embodiment, and accordingly explanation thereof will be omitted.

Figure 8:
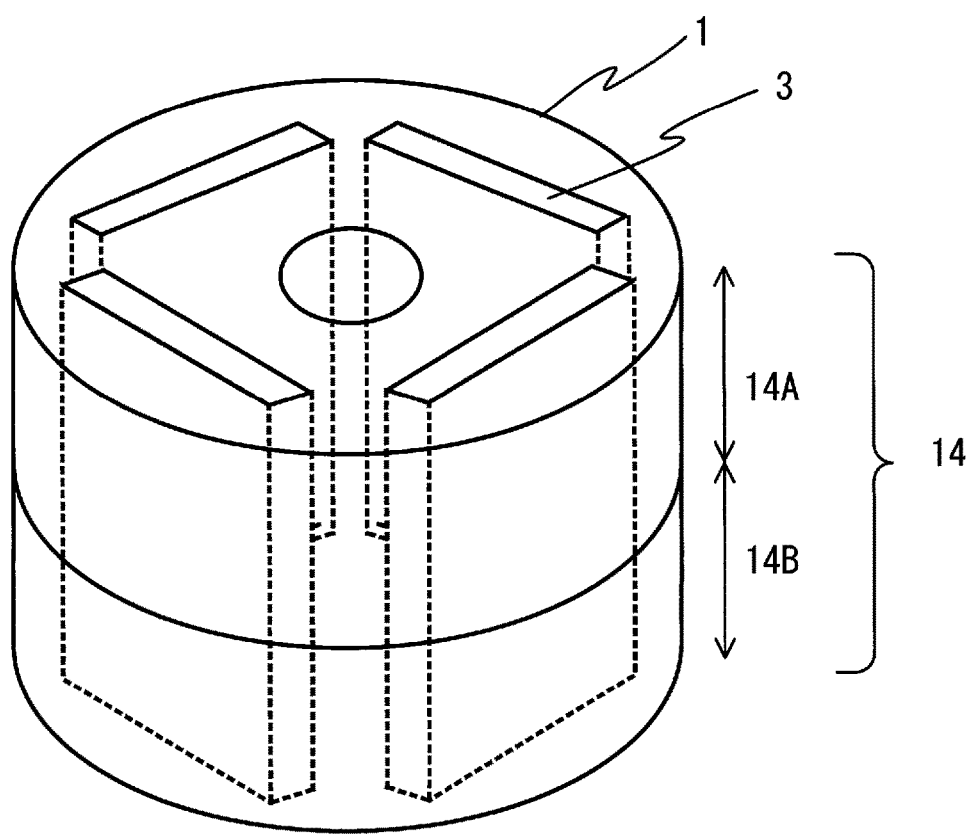
FIG. 8 is a perspective view of a rotor of a permanent magnet electric motor according to a third embodiment of the present invention.
Figure 9A:
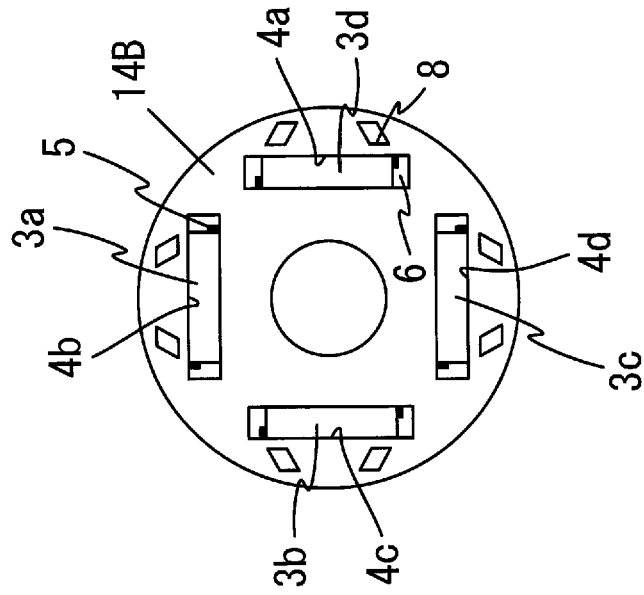
FIGS. 9A and 9B are sectional views of this rotor of the permanent magnet electric motor according to the third embodiment of the present invention, taken in the radial direction.
Figure 9B:
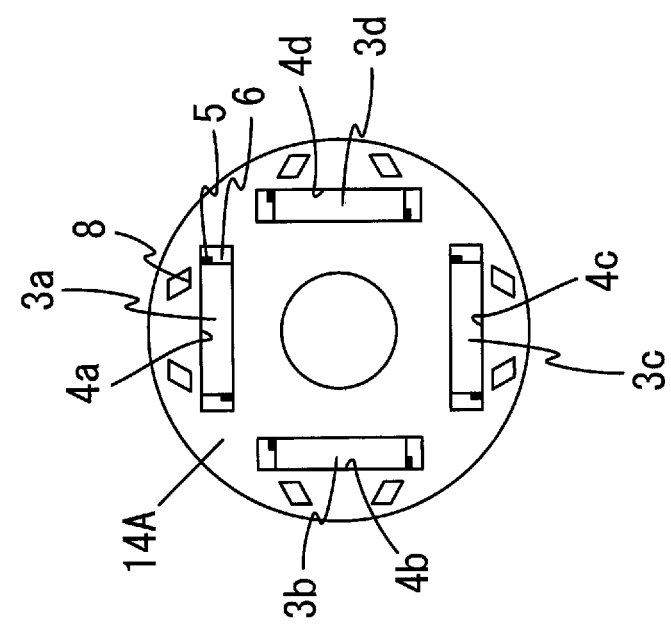

FIG. 8 is a perspective view of a four pole rotor 1 of a permanent magnet electric motor 100 according to this third embodiment. And FIGS. 9(a) and 9(b) are sectional views of the rotor 1 shown in FIG. 8 taken in the radial direction, respectively including sectional views of rotor cores 14A and 14B also taken in the radial direction. In terms of structure, both the rotor core 14A and the rotor core 14B will be referred to as rotor cores 14. The way in which the structure of the rotor cores 14 is different from that of the rotor core 2 shown in FIG. 3 is that the projections 5 are positioned at two locations that are positioned diagonally opposite across the four corner edges of the permanent magnet 3, and that the diagonal positions of the projection 5 in neighboring ones of the magnet insertion openings 4 are mutually opposite. As will be described hereinafter, in the structure of the rotor 1 shown in FIG. 8, the rotor core 14B is disposed as rotated by the space of one pole (i.e. through 90°) in the circumferential direction with respect to the rotor core 14A, and accordingly the different reference symbols 14A and 14B are used.

The positional relationship of the rotor core 14A, the rotor core 14B, and the permanent magnets 3 shown in FIG. 8 will now be explained in concrete terms using FIGS. 9(a) and 9(b). In order to simplify the explanation, the magnet insertion openings 4 formed in the rotor core 14A and in the rotor core 14B will now be shown as magnet insertion openings denoted by the reference symbols 4a through 4d. Furthermore, the permanent magnets 3 will now be shown as permanent magnets denoted by the reference symbols 3a through 3d. The rotor core 14B shown in FIG. 9(b) is disposed as rotated by the space of one pole (i.e. through 90°) in the circumferential direction with respect to the rotor core 14A shown in FIG. 9(a). The rotor core 14A and the rotor core 14B are laminated together in the axial direction while maintaining their arrangement without alteration. To describe their positional relationship, including that of the permanent magnets 3, the positions of the magnet insertion openings 4a through 4d of the rotor core 14B are rotated through 900 in the circumferential direction as respectively compared with the positions of the magnet insertion openings 4a through 4d of the rotor core 14A, while the positions of the permanent magnets 3a through 3d are not changed. This means, for example, that the magnet insertion opening 4a of the rotor core 14A and the magnet insertion opening 4b of the rotor core 14B are laid over one another, and that the permanent magnet 3a is inserted into both of them. The positional relationships of the other magnet insertion openings and the other permanent magnets are similar.

The positions of the projections 5 of the rotor core 14 will now be described by considering the case in which the magnet insertion openings 4b through 4d of the rotor core 14 are rotated in the circumferential direction so as to become superimposed upon the position of the magnet insertion opening 4a. Projections 5 are formed in the magnet insertion opening 4a at the upper right and at the lower left in the figure of the permanent magnet 3 that is inserted into the magnet insertion opening 4a. In the same manner as in the case of the magnet insertion opening 4a, projections 5 are formed in the magnet insertion opening 4c at the upper right and at the lower left in the figure of the permanent magnet 3 that is inserted into the magnet insertion opening 4c. On the other hand, projections 5 are formed in the magnet insertion openings 4b and 4d at the lower right and at the upper left in the figure of the permanent magnets 3.

Based upon the above, the positional relationship of the projections 5 with respect to the rotor core 14A and the rotor core 14B will be described. In the magnet insertion opening 4a of the rotor core 14A, projections 5 are formed at the upper right and the lower left of the permanent magnet 3a that is inserted into that magnet insertion opening 4a. On the other hand, in the magnet insertion opening 4b of the rotor core 14B, projections 5 are formed at the lower right and the upper left of the permanent magnet 3a that is inserted into that magnet insertion opening 4b. Accordingly, it is possible for positioning of the four corner edges of the permanent magnet 3a to be performed by the two projections 5 that are formed at the magnet insertion opening 4a of the rotor core 14A and the two projections 5 that are formed at the magnet insertion opening 4b of the rotor core 14. The same holds for the projections 5 of the other magnet insertion openings 4 and the other permanent magnets 3. By thus performing positioning at the four corner edges of the permanent magnets 3, it is possible to enhance the advantageous effects of positioning the permanent magnets 3, as compared to the case in which positioning is only performed at two corner edges, one on each edge of the permanent magnets 3. Moreover, since the rotor core 14A and the rotor core 14B are both examples of a rotor core 14 and have the same structure, it is possible to manage with only one type of mold for use in the press machine for forming them, so that this construction is well adapted to mass production.

Figure 10:
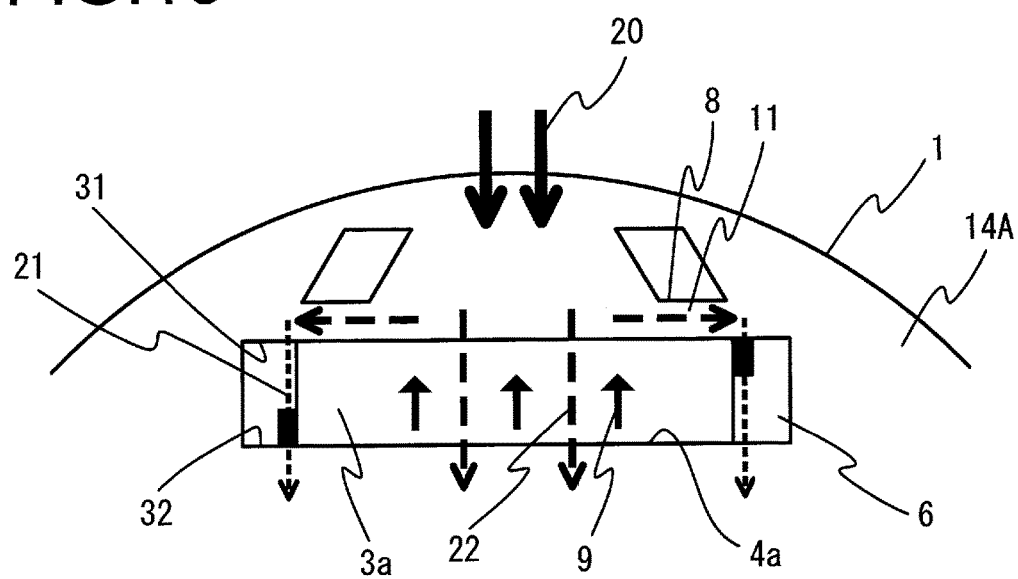
FIG. 10 is a sectional view of one pole in this rotor of the permanent magnet electric motor according to the third embodiment of the present invention, taken in the radial direction.

FIG. 10 is a sectional view of one pole in this rotor 1 of the permanent magnet electric motor 100 according to the third embodiment, taken in the radial direction. In the following, the theory of enhancement of the resistance of the permanent magnet 3a to demagnetization will be explained, taking the pole for which the magnet insertion opening 4a of the rotor core 14A is formed as an example. Due to the positions of the projections 5 being formed at two of the four corner edges of the permanent magnet 3a that are in a diagonal relationship, even if a demagnetizing magnetic field 20 is applied from the stator 50 (not shown in this figure) in the direction opposite to the direction of magnetization 9 of the permanent magnet 3a, since the projections 5 are formed only at either an external circumferential corner edge portion 31 of the magnet insertion opening 4a or at an internal circumferential corner edge portion 32 thereof, accordingly the demagnetizing magnetic fields 21 in the magnet insertion openings 4a that are applied at the neighborhoods of the edge portions of the permanent magnet 3a are reduced. As a result, the resistance of the permanent magnet 3a to demagnetization is enhanced. The same holds for the magnet insertion openings 4b through 4d of the rotor core 14A, and for the magnet insertion openings 4a through 4d of the rotor core 14B.

According to the third embodiment as explained above, it is possible to reduce the number of the projections 5, which are the cause for increase of the demagnetizing magnetic fields 21, without losing any of the beneficial effect for fixing the positions of the permanent magnets 3 by their four corner edges. Accordingly it is possible to reduce the demagnetizing magnetic fields 21, and thereby it is possible to enhance the resistance of the permanent magnets 3 to demagnetization. Moreover, since it is only necessary to manufacture one version of the rotor core 14, accordingly this construction is excellent from the point of view of mass production.

While the construction of this embodiment included the rotor core 14A and the rotor core 14B as two layers, a construction would also be possible in which the rotor core 14A and the rotor core 14B appear alternatingly as multiple layers. Moreover, the relative rotational angle in the circumferential direction of the rotor core 14A and the rotor core 14B could be any desired angle, provided that the magnet insertion openings before rotation and after rotation are superimposed, and that all of the four corner edges 4 of the permanent magnets 3 are positionally determined.

In this embodiment, it would also be possible to obtain similar beneficial effects if the number of poles, or the number of slots, or the type of winding, or the like is different. Furthermore, while it is necessary for the rotational angle in the circumferential direction of the rotor core 14 to change to match the number of poles, any angle of rotation would be acceptable, provided that the magnet insertion openings 4 before rotation and after rotation agree with one another, and moreover provided that the positions of all of the four corner edges of the permanent magnets 3 are determined.

Embodiment #4

While in the third embodiment the projections 5 were arranged so as to perform positional determination of the four corner edges of the permanent magnets 3, it will be sufficient if one of the projections 5 is disposed at each of the corner edges of each of the permanent magnets 3 as described above. An example of this is described below as a fourth embodiment. It should be understood that, in this embodiment, the structure of the stator 50 and the windings 52 and so on in this embodiment is the same as in the case of the first embodiment, and accordingly explanation thereof will be omitted.

FIGS. 11(a) and 11(b) are sectional views of a rotor 1 of this fourth embodiment taken in the radial direction, and are figures respectively including rotor cores 15A and 15B. The structure of the rotor 1 of this embodiment resembles that of the rotor 1 of the third embodiment, with the rotor core 14A of the rotor 1 shown in FIG. 8 being replaced by a rotor core 15A, and the rotor core 14B being replaced by a rotor core 14B. Furthermore, the construction of the rotor core 15A and that of the rotor core 15B are the same construction of a rotor core 15. In the construction of the rotor core 15A, all of the projections 5 on the external circumferential side of the magnet insertion openings 4 of the rotor core 14A have been removed. In a similar manner, in the construction of the rotor core 15B, all of the projections 5 on the external circumferential side of the magnet insertion openings 4 of the rotor core 14B have been removed. Since one projection is formed at each of the edges of each of the permanent magnets 3a through 3b with the rotor 1 of this embodiment that comprises the rotor core 15A and the rotor core 15B, accordingly it is possible to ensure the beneficial effects for positioning the permanent magnets 3a through 3d, even though more of the projections 5 have been removed than in the case of the third embodiment. Furthermore, since the number of projections 5 in this embodiment is less than the number in the third embodiment, accordingly it is possible to make it more difficult for the edge portions of the permanent magnets 3a through 3d to become demagnetized, so that, as a result, it is possible to enhance the resistance of the permanent magnets 3a through 3d to demagnetization.

According to this embodiment, it is possible to reduce the number of the projections 5 which are the cause of increase of the demagnetizing magnetic fields 21, without losing the beneficial effect provided by these projections 5 of positioning both the edges of the permanent magnets 3. Accordingly, it is possible to reduce the demagnetizing electric fields 21, and it is possible to enhance the resistance of the permanent magnets 3 to demagnetization. Moreover this arrangement is excellent from the point of view of mass production, since it is only necessary to manufacture one version of the rotor core 15.

In this embodiment, it is arranged to position both edges of the permanent magnets 3 with the projections 5 on the inner circumferential side of the magnet insertion openings 4. However, it would be acceptable to form at least one of the projections 5 at each of the edges in the circumferential direction of the permanent magnets 3; in other words, it would be acceptable for these projections 5 that are formed at each of the edges to be formed at least at one or the other of the external circumferential side and the internal circumferential side.

One or a plurality of the embodiments described above may also be combined.

The above explanation is only given by way of example; the present invention is not to be considered as being limited by any of the features of the embodiments described above.

The contents of the disclosure of the following application, upon which priority is claimed, are hereby incorporated herein by reference:
Japanese Patent Application 2013-90, 101 (filed on Apr. 23, 2013).

REFERENCE SIGNS LIST

1: rotor, 2: rotor core, 3: permanent magnet, 3a~3d: permanent magnets, 4: magnet insertion opening, 4a~4d: magnet insertion openings, 5: projection, 6: vacant space, 7: shaft, 8: slit, 9: direction of magnetization, 11: rotor magnetic path, 12: rotor magnetic path, 13: rotor core, 14: rotor core, 14A, 14B: rotor cores, 15A, 15B: rotor cores, 20~23: demagnetizing magnetic fields, 31~32: magnet insertion opening edge portions, 40: demagnetizing magnetic field application portion, 50: stator, 51: teeth, 52: winding, 53: stator slot, 100: permanent magnet electric motor

The invention claimed is:

1. A permanent magnet electric motor, comprising:
a rotor that comprises a rotor core around a circumferential direction of which only four magnet insertion openings are formed, and only four permanent magnets that are respectively inserted in the four magnet insertion openings; and
a stator that comprises a stator core around a circumferential direction of which a plurality of slots are formed, and windings that are inserted into the plurality of slots; wherein:
a plurality of projections integrally formed with the rotor core and formed at least partially along an axial direction in the magnet insertion openings, wherein for each magnet insertion opening, a first projection projects into the magnet insertion opening from a first position and a second projection projects into the magnet insertion opening from a second position in order to position opposing edges of the respective permanent magnet between the first and second projections in the circumferential direction so that vacant spaces are defined at each side of the permanent magnet in the circumferential direction, wherein the first position and the second position are diagonally opposed to each other, and the first projection and the second projection are the only projections of the plurality of projections;
a plurality of slits arranged along the circumferential direction are provided in regions, the region being positioned radially outward from the permanent magnet and being sandwiched at the edges of the permanent magnet in the circumferential direction by the projections; and
the shortest distance between the slit and the magnet insertion opening is set to be greater than the shortest distance between the slit and an outer circumferential surface of the rotor core.

2. A permanent magnet electric motor according to claim 1, wherein:
the rotor core comprises a first rotor core division in which a plurality of first magnet insertion openings are formed and a second rotor core division in which a plurality of second magnet insertion openings are formed, the first magnet insertion opening in which the projection is formed constituting a portion of the magnet insertion opening and the second magnet insertion opening in which no projection is formed constituting a portion of the magnet insertion opening; and
the first and second rotor core divisions are overlapped so that the first magnet insertion opening and the second magnet insertion opening coincide in the axial direction.

3. A permanent magnet electric motor according to claim 1, wherein:
the rotor core comprises a plurality of rotor core divisions laminated in the axial direction, the rotor core division comprising first magnet insertion openings and second magnet insertion openings, the first magnet insertion opening constituting a portion of the magnet insertion opening, and the second magnet insertion opening constituting a portion of the magnet insertion opening; and
one pair of the plurality of rotor core divisions are laminated together so that the first magnet insertion openings in one of the rotor core divisions and the second magnet insertion openings in the other of the rotor core divisions coincide in the axial direction.

* * * * *